(12) United States Patent
Machani et al.

(10) Patent No.: US 9,954,680 B1
(45) Date of Patent: Apr. 24, 2018

(54) SECURE MANAGEMENT OF A MASTER ENCRYPTION KEY IN A SPLIT-KEY BASED DISTRIBUTED COMPUTING ENVIRONMENT

(71) Applicant: EMC Corporation, Hopkinton, MA (US)

(72) Inventors: Salah Machani, Toronto (CA); Lawrence N. Friedman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 144 days.

(21) Appl. No.: 14/974,454

(22) Filed: Dec. 18, 2015

(51) Int. Cl.
*H04L 9/08* (2006.01)

(52) U.S. Cl.
CPC ............ *H04L 9/085* (2013.01); *H04L 9/0822* (2013.01); *H04L 9/0825* (2013.01); *H04L 9/0861* (2013.01)

(58) Field of Classification Search
CPC ....................................................... H04L 9/085
See application file for complete search history.

(56) References Cited

U.S. PATENT DOCUMENTS

| | | | | |
|---|---|---|---|---|
| 5,625,692 | A * | 4/1997 | Herzberg | H04L 9/085 380/286 |
| 8,074,068 | B2 * | 12/2011 | Fujii | H04L 9/085 380/212 |
| 8,077,863 | B2 * | 12/2011 | Hosaka | H04Q 9/085 380/212 |
| 8,184,813 | B2 | 5/2012 | Kaji | |
| 2005/0086471 | A1 | 4/2005 | Spencer | |
| 2006/0023887 | A1 * | 2/2006 | Agrawal | H04L 9/083 380/277 |
| 2007/0160197 | A1 * | 7/2007 | Kagaya | G06Q 20/382 380/28 |
| 2010/0054458 | A1 * | 3/2010 | Schneider | H04L 9/085 380/28 |

(Continued)

OTHER PUBLICATIONS

Accredited Standards Committee X9, Incorporated; "Request for Review of Key Wrap Algorithms", Nov. 2004, 18 pages.

(Continued)

*Primary Examiner* — Simon Kanaan
(74) *Attorney, Agent, or Firm* — BainwoodHuang

(57) ABSTRACT

A master encryption key is split at a key splitting server such that three key shares are required to reconstruct it, and is then destroyed. The key shares are distributed such that an encrypted remote management server key share is stored at a remote management server, an encrypted managed device key share is stored at a managed device, and a key splitting server key share is stored on the key splitting server. Incoming communications to the key splitting server from managed devices are prevented, and outgoing communications from the key splitting server are only allowed to managed devices. The managed device obtains the master encryption key at startup by sending its managed device key share to the remote management server, which sends the managed device key share and the remote management server key share to the key splitting server. The key splitting server reconstructs the master encryption key, encrypts it using a public key of the managed device, and sends it to the managed device.

23 Claims, 6 Drawing Sheets

(56) References Cited

U.S. PATENT DOCUMENTS

2012/0243687 A1* 9/2012 Li .......................... H04L 9/085
                                                            380/277

OTHER PUBLICATIONS

AES Key Wrap Specification; Nov. 16, 2001; 23 pages.
Schaad, J.; "Advanced Encryption Standard (AES) Key Wrap Algorithm"; Network Working Group, RSA Laboratories, Sep. 2002; downloaded from <https://tools.ietf.org/rvd/rfc3394> on Jul. 24, 2015; 30 pages.
Shamir, Adi; "How to Share a Secret"; Laboratory for Computer Science, Massachusetts Institute of Technology (MIT), Cambridge, MA, Communications of the ACM, vol. 22, No. 11, Nov. 1979; 2 pages.

* cited by examiner

SECURE MANAGEMENT OF A MASTER ENCRYPTION KEY IN A SPLIT-KEY BASED DISTRIBUTED COMPUTING ENVIRONMENT

BACKGROUND

In modern cryptography, cryptographic keys (or simply "keys") are used by encryption circuits or logic to determine how data is to be encrypted and/or decrypted. For example, a key may specify the particular transformation to be performed on input data during encryption, and/or the reverse process during decryption. Keys may also be used in other types of cryptographic operations, such as generating digital signatures, and/or message authentication.

Distributed computing environments often use a "master encryption key" for certain types of data encryption performed by the devices they contain. In some systems, the master encryption key is required in order to perform certain encryption operations that must occur during the start-up process for individual devices. Accordingly, the master key may be required to re-start a device after a power loss, or to set up a newly added device. Because master encryption keys are often used to perform basic, underlying encryption operations, they must be stored securely, so that the security of both the individual devices and the overall computing environment is maintained.

SUMMARY

Prior approaches to protecting master encryption keys have exhibited significant shortcomings. For example, in some previous systems, if an attacker gains unauthorized access to a single device, the attacker may be able to use the compromised device to obtain critical information (passwords, keys, etc.) from within the device itself, and/or from other devices and/or servers operating within the distributed system, and use the information to access and/or reconstruct a master encryption key. Such security weaknesses arise because in some previous systems individual devices store both the keys that are used to authenticate to a remote server that can provide a master encryption key to the device, and other data that enables the device to obtain the master encryption key using the server.

Some previous systems have also required that an administrator user's password be provided in order to access the master encryption key when starting up a device. Such requirements are cumbersome and difficult to support, especially in distributed computing environments with very large numbers of devices.

To address these and other shortcomings of previous systems, techniques are disclosed herein for secure management of a master encryption key in a split-key based distributed computing environment. In the disclosed system, a key splitting server generates a master encryption key for one or more managed devices. The key splitting server uses a polynomial-based secret sharing technique to split the master encryption key into a set of key shares, such that at least a threshold number of the resulting key shares must be combined to reconstruct the master encryption key. In the disclosed system, the threshold number of different key shares that must be combined to reconstruct the master encryption key is at least three. The key splitting server distributes individual key shares to different components in the distributed computing environment. A first one of the key shares, referred to herein as the remote management server key share, is encrypted using a key encryption key, and is then transmitted to and stored on a remote management server (e.g. a dynamic virtual private or "cloud" server). A second one of the key shares, referred to herein as the managed device key share, is also encrypted using the key encryption key, and is then transmitted to and stored on at least one managed device. A third one of key shares, referred to as the key splitting server key share is stored on the key splitting server. After the key shares are distributed in this way, the key splitting server destroys the original copy of the master encryption key, thus securing the master encryption key from unauthorized access.

The key encryption key used by the key splitting server to encrypt the remote management server key share and the managed device key share may be the key splitting server key share. Alternatively, the key encryption key used by the key splitting server to encrypt the remote management server key share and the managed device key share may be a public key of a public/private key pair uniquely assigned to the key splitting server. The key splitting server key share may also be encrypted, prior to being stored on the key splitting server, e.g. using the public key assigned to the key splitting server. The encryption performed on the remote management server key share and the managed device key share may, for example, be performed using a key wrapping technique.

The key splitting server may be configured such that it only allows outgoing communications to be initiated to the managed device or devices, and does not allow any incoming communications to be received from any managed device. For example, when the disclosed system is initially set up, the remote management server may send a message to the key splitting server including a list of managed devices. For each managed device, the list may include network addressing information, and a public key or certificate. Based on this list, the key splitting server may prevent incoming communications to be received from any managed device on the list, and only allow outgoing communications to be initiated from the key splitting server to the managed device or devices on the list. Outbound communications from the key splitting server to any device that is not on the list of managed devices are not allowed.

In an alternative embodiment or configuration, a network firewall may be configured to allow outgoing communications from the key splitting server to only be directed to the managed devices, and to no other devices. In such an embodiment or configuration, the network firewall is also configured to prevent any communications from being directed to the key splitting server from any managed device.

The disclosed system may further perform a start-up operation on the managed device, in which the managed device sends a master encryption key request, including its own managed device key share, to the remote management server. In response to receipt of the master encryption key request, the remote management server sends a request to reconstruct the master encryption key to the key splitting server. The request to reconstruct the master encryption key may include an identifier or address of the managed device from which the remote management server received the request for the master encryption key, together with the managed device key share received by the remote management server from the managed device, and the remote management server key share. The key splitting server decrypts the managed device key share and the remote management server key share, e.g. using the key encryption key if the key encryption key is the key splitting server share, or using the private key of the public/private key pair uniquely assigned to the key splitting server if the key encryption key is the public key of the public/private key pair uniquely assigned to the key splitting server. The key splitting server may also decrypt the key splitting server key share using its private key if the key splitting key share was encrypted using the public key of the key splitting server. Using the decrypted managed device key share, the decrypted remote management server key share, and the key splitting server key share (decrypted if needed), the key splitting server reconstructs the master encryption key. The key splitting server then sends the reconstructed master encryption key to the managed device that sent the request for the master encryption key to the remote management server. The key splitting server may encrypt the reconstructed master encryption key with the public key of the managed device that requested the master encryption key prior to sending the reconstructed master encryption key to the managed device that requested the master encryption key.

The managed device that issued the request receives the reconstructed master encryption key, uses its private key to decrypt the received master encryption key if necessary, and uses the master encryption key to complete its startup. When the startup of the managed device is completed, the managed device destroys the reconstructed the master encryption key. The master encryption key is not stored in any persistent storage of the managed device.

Thus there is disclosed a new approach to protecting a master encryption key in a distributed computing environment. The disclosed system provides significant advantages over previous systems. For example, the disclosed system prevents an attacker who gains unauthorized access to a single device from using information from within that device to access and/or reconstruct a master encryption key. Instead, in order to successfully obtain the master encryption key, an attacker must successfully attack three separate components of the distributed system—i) the remote management server, ii) the key splitting server, and iii) the managed device. As a result, the security of both the individual managed device and of the complete distributed system is significantly improved.

The disclosed system also advantageously supports unattended start-up of a managed device, since the disclosed system may automatically and securely provide the master encryption key to the managed device during a start-up operation. In this way the disclosed system enables the managed device to start-up without requiring an administrator user to enter or otherwise provide their password in order for the master encryption key to be made available to the managed device during the start-up operation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention is broader than the specific examples of embodiments disclosed herein.

Figure 1:
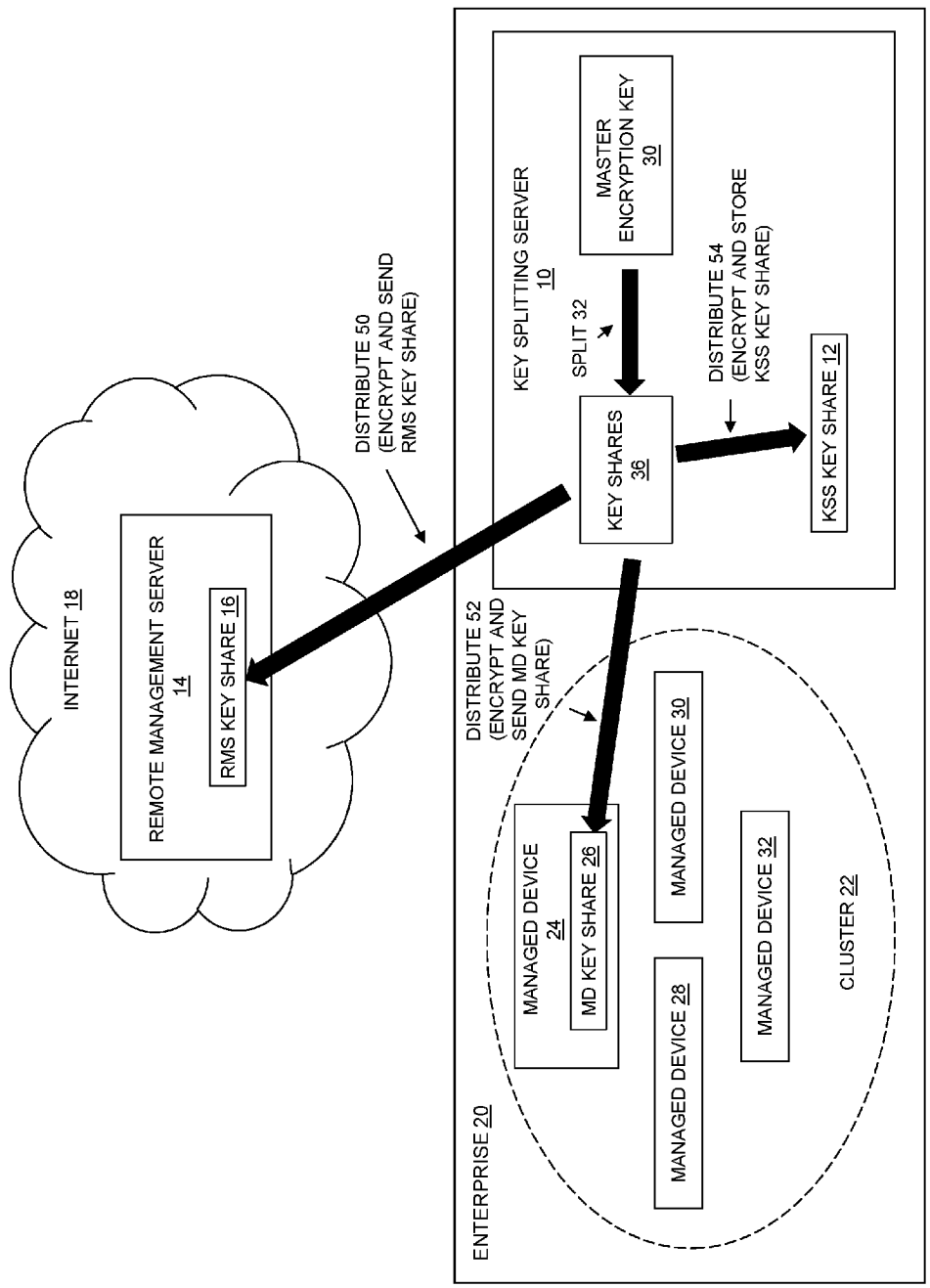
FIG. 1 is a block diagram of a distributed computing environment in which the disclosed system may be embodied, and illustrating the disclosed techniques for splitting a master encryption key and distribution of the resulting key shares by a key splitting server to secure the master encryption key against unauthorized access.

FIG. 1 shows a distributed computing environment in which the disclosed system may be embodied, and illustrates the disclosed techniques for splitting of a master encryption key and distribution of the resulting key shares by a key splitting server to secure the master encryption key against unauthorized access. As shown in FIG. 1, an example of a distributed computing environment includes a Remote Management Server 14, which may be located on an external unsecured communication network, shown for purposes of illustration as the Internet 18. Remote Management Server 14 is communicably connected to a number of managed devices belonging to a business enterprise, shown for purposes of illustration in FIG. 1 by Cluster 22 located within Enterprise 20. Cluster 22 may include any number of managed devices, shown for purposes of illustration in FIG. 1 by Managed Device 24, Managed Device 28, Managed Device 30, and Managed Device 32. Remote Management Server 14 is further communicably connected to a Key Splitting Server 10, which also is contained within, belongs to, or is under the control of Enterprise 20.

Enterprise 20 may be any specific type of business organization that uses or controls computing resources and/or data. For example, Enterprise 20 may be a company or corporation, or any other specific type of business organization, or a governmental agency or department. Alternatively, in an embodiment provided in a cloud computing environment, Enterprise 20 may be embodied as a tenant within a multitenant software architecture, and Remote Management Server 14 may be embodied to perform the operations described herein as at least part of providing one or more cloud-based services to one or more tenants (e.g. enterprises) consuming those services within a multi-tenant software architecture.

Cluster 22 and Key Splitting Server 10 may be located on one or more networks that are secure and private to Enterprise 20. For example, Cluster 22 and Key Splitting Server 10 may be connected to an intranet under the control of (e.g. belonging to or contained within) Enterprise 20, and separated from the Internet 18 by a network security system such as a firewall or the like. Cluster 22 may be any specific type of loosely or tightly connected set of managed devices that work together and may be viewed and/or managed as a single system. For example, the managed devices within Cluster 22 and the Key Splitting Server 10 may be connected to each other through a secure local area network ("LAN") or the like that is under the control of Enterprise 20, and operate together to jointly provide one or more services with high performance (e.g. by performing load balancing across different managed devices), and/or high availability (e.g. by performing failover as needed across redundant managed devices).

Each of the managed devices in Cluster 22, and/or Key Splitting Server 10 may, for example, include or consist of a hardware device or computer having software and/or firmware, or may include or consist of software running on a virtual machine supported by a virtual operating platform such as a hypervisor. Each managed device operates to provide one or more resources and/or related services to users in Enterprise 20. For example, in one embodiment, the managed devices in Cluster 22 may consist of or include security server devices and/or software. In such an embodiment, the managed devices may provide security services such as single sign-on to enterprise resources to enterprise users and/or enterprise customers.

The remote server component shown by Remote Management Server 14 may be embodied as one or more physical server computer systems, or alternatively as one or more virtual private servers (VPSs), such as a cloud server or the like.

During operation of the embodiment shown in FIG. 1, Key Splitting Server 10 generates a Master Encryption Key 30 for use by one or more of the managed devices in Enterprise 20. The Master Encryption Key 30 may be generated using any specific technique for generating cryptographic keys, such as using a random number generator, pseudorandom number generator, or any other appropriate technique.

As shown at reference number 32 in FIG. 1, Key Splitting Server 10 uses a polynomial-based secret sharing technique to split Master Encryption Key 30 into a set of Key Shares 36, such that at least a threshold number k of the resulting Key Shares 36 must be combined to reconstruct the Master Encryption Key 30. The disclosed system may be embodied such that Master Encryption Key 30 is split using a (k, n) threshold scheme in which Master Encryption Key 30 is split into n key shares, such that (i) any k or more different key shares are necessary to reconstruct the master encryption key, and (ii) Master Encryption Key 30 cannot by determined based on k−1 or fewer key shares. Examples of specific polynomial-based secret sharing techniques that may be used in the disclosed system are described in "How to Share a Secret" by Adi Shamir, Communications of the ACM, November 1979, Volume 22, Number 11, all disclosures of which are hereby included herein by reference. In the disclosed system, the threshold number k of different key shares that must be combined to reconstruct Master Encryption Key 30 is at least three.

The Key Splitting Server 10 distributes individual ones of the Key Shares 36 to different components in the distributed computing environment shown in FIG. 1. At reference number 50 in FIG. 1, a first one of the Key Shares 36 is encrypted by the Key Splitting Server 10 using a key encryption key, and is then transmitted to and stored on Remote Management Server 14 as Remote Management Server (RMS) Key Share 16. At reference number 52 in FIG. 1, a second one of the Key Shares 36 is also encrypted using the key encryption key, and is then transmitted to and stored on Managed Device 24 as Managed Device (MD) Key Share 26. At reference number 54 in FIG. 1, a third one of the Key Shares 36 may also be encrypted and is stored on the Key Splitting Server 10 as Key Splitting Server (KSS) Key Share 12. After the RMS Key Share 16, MD Key Share 26 and KSS Key Share 12 are distributed in this way, the Key Splitting Server 10 may destroy the original copy of Master Encryption Key 30, for example by deleting all copies of Master Encryption Key 30 from Key Splitting Server 10. In this way, Master Encryption Key 30 is secured from unauthorized access.

The key encryption key used by Key Splitting Server 10 to encrypt the RMS Key Share 16 and the MD Key Share 26 may be the KSS Key Share 12. Alternatively, the key encryption key used by Key Splitting Server 10 to encrypt the RMS Key Share 16 and MD Key Share 26 may be a public key of a public/private key pair uniquely assigned to Key Splitting Server 10. The public/private key pair uniquely assigned to Key Splitting Server 10 may, for example be obtained by Key Splitting Server 10 from a certificate authority or other trusted third party entity.

The KSS Key Share 12 may also be encrypted, prior to being stored on the Key Splitting Server 10, e.g. using the public key of the public/private key pair assigned to the Key Splitting Server 10.

The encryption performed on the RMS Key Share 16 and/or the MD Key Share 26 may, for example, be performed using a key wrapping technique. Such key wrapping techniques may, for example, include symmetric encryption algorithms. Accordingly, after RMS Key Share 16 and/or MD Key Share 26 are encrypted ("wrapped") using the key encryption key (e.g. the KSS Key Share 12), the key encryption key is subsequently required in order to unwrap the RMS Key Share 16 and/or MD Key Share 26 before either can be used to reconstruct the Master Encryption Key 30. For example, the key wrapping techniques used to encrypt the RMS Key Share 16 and/or MD Key Share 26 may include such techniques as those described in the Advanced Encryption Standard (AES) Key Wrap Specification, and/or in American Standards Committee ANSX9.102.

Alternatively, in an embodiment or configuration in which the public key of the public/private key pair uniquely assigned to the Key Splitting Server 10 is used as the key encryption key to encrypt RMS Key Share 16 and/or the MD Key Share 26, then the private key of the public/private key pair uniquely assigned to the Key Splitting Server 10 is subsequently required in order to unwrap the RMS Key Share 16 and/or MD Key Share 26 before either can be used to reconstruct the Master Encryption Key 30. Similarly, in an embodiment or configuration in which the KSS Key Share 12 is encrypted using the public key of the public/private key pair assigned to the Key Splitting Server 10, then the private key of the public/private key pair uniquely assigned to the Key Splitting Server 10 is subsequently required in order to unwrap the KSS Key Share 12 before it can be used to reconstruct the Master Encryption Key 30.

The Key Splitting Server 10 may be configured such that outgoing communications from Key Splitting Server 10 may only be initiated to managed devices (e.g. to managed devices 24, 28, 30 and 32), and such that incoming communications are not allowed from any managed device to Key Splitting Server 10. For example, when the disclosed system is set up, the Remote Management Server 14 may send a message to the Key Splitting Server 10 including a list of managed devices. For each managed device indicated by the list (e.g. Managed Device 24, Managed Device 28, Managed Device 30, and Managed Device 32), the list may include network addressing information, and a public key or certificate. Based on the contents of the list, the Key Splitting Server 10 may prevent incoming communications to the Key Splitting Server 10 from any managed device on the list (e.g. from Managed Device 24, Managed Device 28, Managed Device 30, or Managed Device 32), and only allow outgoing communications from the Key Splitting Server 10 to managed devices on the list (e.g. to Managed Device 24, Managed Device 28, Managed Device 30, or Managed Device 32). Outbound communication from the Key Splitting Server 10 to any device that is not on the list of managed devices is not allowed.

In an alternative embodiment or configuration, a network firewall may be configured to allow outgoing communications from Key Splitting Server 10 to only be directed to the managed devices, and to no other devices. In such an embodiment or configuration, the network firewall is also configured to prevent any communications from being directed to Key Splitting Server 10 from any managed device.

While the example of FIG. 1 shows only one managed device key share (MD Key Share 26) being stored in only a single managed device (Managed Device 24), the disclosed system is not so limited. Those skilled in the art will recognize that a single managed device key share may be stored in multiple managed devices (e.g. within each of the managed devices shown in Cluster 22, or within each managed device in Enterprise 20, etc.). In addition, those skilled in the art will recognize that different managed device key shares may also be generated and stored within different managed devices (e.g. a different managed device key share may be stored in each different one of the managed devices shown in Cluster 22, or within each different managed device in Enterprise 20). Other specific distributions of managed device key shares may also be provided as appropriate for specific distributed computing environments.

Those skilled in the art will also recognize that while for purposes of concise illustration only four managed devices are shown in FIG. 1, the disclosed system is not limited to use with any specific number of managed devices.

Figure 2:
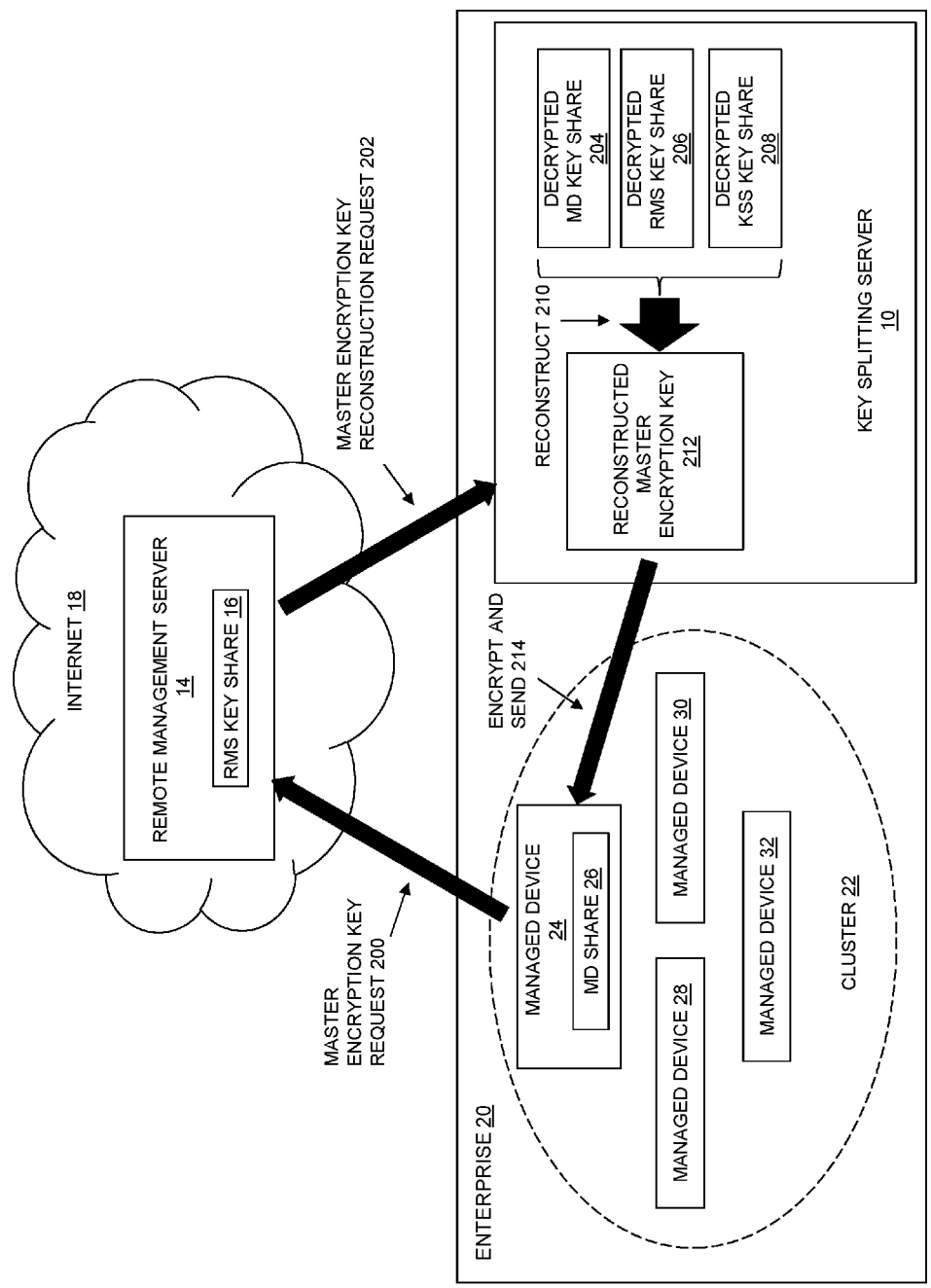
FIG. 2 is a block diagram showing the distributed computing environment of FIG. 1, and showing the disclosed techniques for unattended start-up of a managed device that include providing a reconstructed master encryption key to the managed device from the key splitting server.

FIG. 2 is a block diagram illustrating the distributed computing environment of FIG. 1, and showing an example of unattended start-up of Managed Device 24 that includes automatically and securely providing a Reconstructed Master Encryption Key 212 to Managed Device 24 from the Key Splitting Server 10. During operation of the embodiment shown in FIG. 2, the disclosed system performs a start-up operation on Managed Device 24. Such a start-up operation may, for example, be triggered when Managed Device 24 is initially deployed, and/or when Managed Device 24 must be re-initialized after experiencing a failure, such as after a power-loss, and/or when Managed Device 24 must be initialized or re-initialized for any other specific reason.

During the start-up operation illustrated in FIG. 2, Managed Device 24 sends a Master Encryption Key Request 200 to Remote Management Server 14. The Master Encryption Key Request 200 includes the managed device key share (e.g. MD Share 26) of Managed Device 24. In response to receipt of the Master Encryption Key Request 200, the Remote Management Server 14 sends a Master Encryption Key Reconstruction Request 202 to the Key Splitting Server 10. The Master Encryption Key Reconstruction Request 202 may include an identifier or address of the managed device from which Remote Management Server 14 received the Master Encryption Key Request 200 (e.g. an identifier or address of Managed Device 24), together with the managed device key share received by Remote Management Server 14 from the managed device (e.g. MD Share 26), and the remote management server key share (e.g. RMS Key Share 16).

In response to receipt of the Master Encryption Key Reconstruction Request 202, Key Splitting Server 10 decrypts the managed device key share (e.g. MD Share 26) and the remote management server key share (e.g. RMS Key Share 16) received in the Master Encryption Key Reconstruction Request 22. For example, in an embodiment or configuration in which MD Share 26 and RMS Key Share 16 are encrypted using a key encryption key made up of the KSS Key Share 12, and using a symmetric key wrapping encryption technique, then Key Splitting Server 10 decrypts MD Share 26 using the KSS Key Share 12 to generate Decrypted MD Key Share 204, and decrypts RMS Key Share 16 using KSS Key Share 12 to generate Decrypted RMS Key Share 206. Alternatively, in an embodiment or configuration in which MD Share 26 and RMS Key Share 16 are encrypted using a key encryption key made up of the public key of a public/private key pair uniquely assigned to Key Splitting Server 10, then Key Splitting Server 10 decrypts MD Share 26 using the private key of the public/private key pair uniquely assigned to Key Splitting Server 10 to generate Decrypted MD Key Share 204, and decrypts RMS Key Share 16 using the private key of the public/private key pair uniquely assigned to Key Splitting Server 10 to generate Decrypted RMS Key Share 206.

In an embodiment or configuration in which KSS Key Share 12 is encrypted using the public key of a public/private key pair uniquely assigned to Key Splitting Server 10, then Key Splitting Server 10 decrypts KSS Key Share 12 using the private key of the public/private key pair uniquely assigned to Key Splitting Server 10 to generate Decrypted KSS Key Share 208.

At reference number 210, Key Splitting Server 10 reconstructs the Master Encryption Key 30 (FIG. 1) by using Decrypted MD Key Share 204, Decrypted RMS Key Share 206, and Decrypted KSS Key Share 208 to generate Reconstructed Master Encryption Key 212. As shown at reference number 214, Key Splitting Server 10 then encrypts and sends Reconstructed Master Encryption Key 212 to Managed Device 24. Key Splitting Server 10 may, for example, send Reconstructed Master Encryption Key 212 to Managed Device 24 based on the identifier or address of Managed Device 24 included in the Master Encryption Key Reconstruction Request 202, and/or based on network address information for Managed Device 24 included in the list of managed devices sent from Remote Management Server 14 to Key Splitting Server 10.

Prior to sending Reconstructed Master Encryption Key 212 to Managed Device 24, Key Splitting Server 10 may encrypt Reconstructed Master Encryption Key 212 using the public key of the managed device that requested the master encryption key, e.g. with the public key of Managed Device 24. For example, Key Splitting Server 10 may encrypt Reconstructed Master Encryption Key 212 using a public key of Managed Device 24 that is contained in the list of managed devices received by Key Splitting Server 10 from Remote Management Server 14. After Key Splitting Server 10 has sent Reconstructed Master Encryption Key 212, Key Splitting Server 10 may destroy all local copies of Reconstructed Master Encryption Key 212.

When Managed Device 24 receives Reconstructed Master Encryption Key 212, it may use its private key to decrypt Reconstructed Master Encryption Key 212. Managed Device 24 may then use the decrypted Reconstructed Master Encryption Key 212 to complete its startup. For example, Managed Device 24 may include a protected key store, the contents of which is encrypted using the master encryption key (e.g. using Reconstructed Master Encryption Key 212 received from Key Splitting Server 10) during the start-up operation. The contents of the protected key store may include user passwords, token seeds, and/or other information that must be encrypted using the master encryption key. For example, in one embodiment, in which Managed Device 24 provides security services such as single sign-on to enterprise resources to enterprise users and/or enterprise customers, Managed Device 24 may maintain a unique encryption key associated with each user, and use that key to encrypt the user's passwords. Such user keys are an example of information that may be stored in a protected key store within Managed Device 24, and that may be encrypted or wrapped during the start-up operation using the master encryption key (e.g. using Reconstructed Master Encryption Key 212 received from Key Splitting Server 10).

When the startup of Managed Device 24 is complete, Managed Device 24 destroys all of its local copies of the Reconstructed Master Encryption Key 212. The master encryption key is not stored in any persistent storage of the Managed Device 24.

Figure 3:
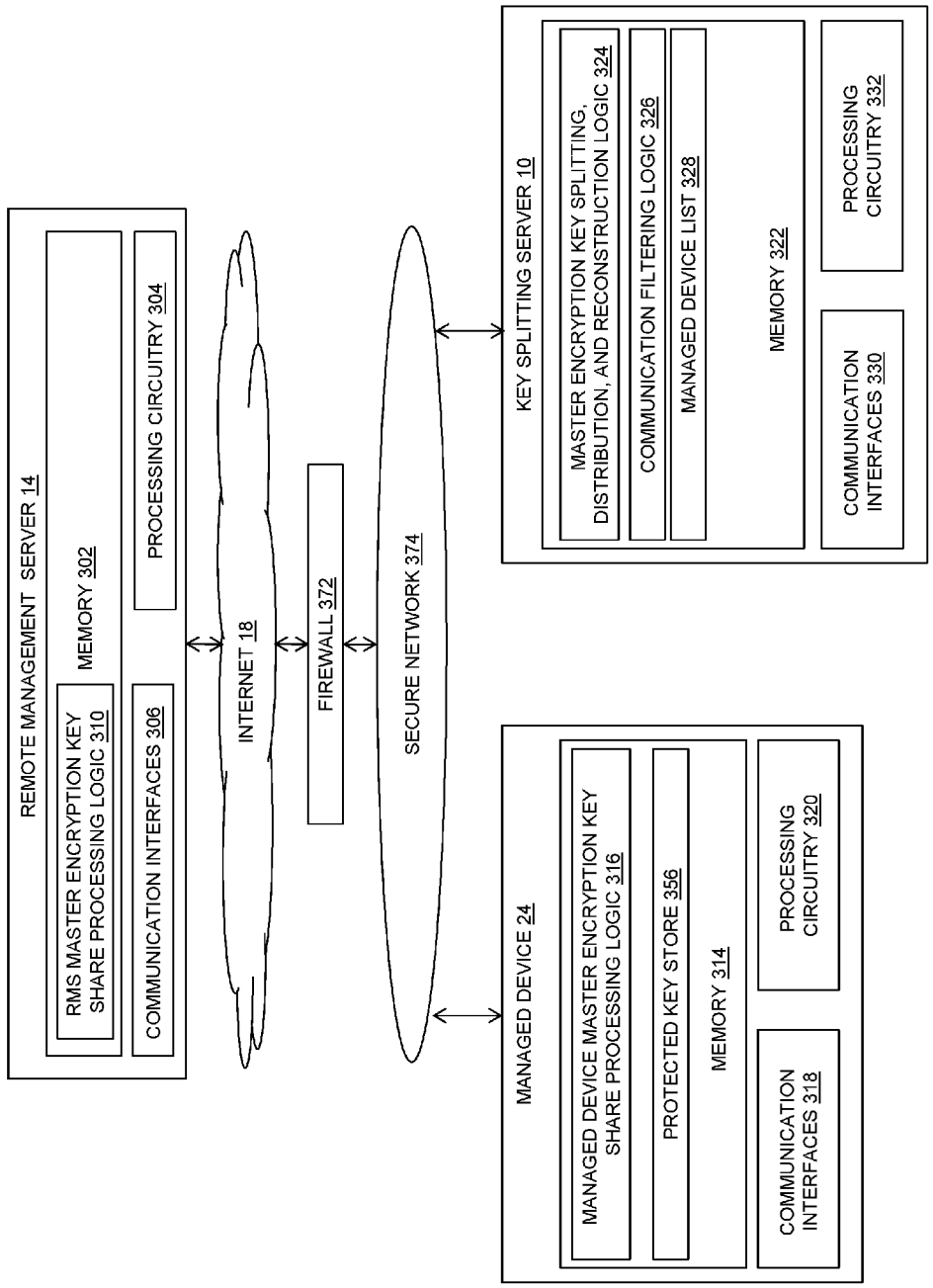
FIG. 3 is a block diagram showing an illustrative embodiment including a key splitting server, remote management server, and a managed device.

FIG. 3 is a block diagram showing illustrative embodiments of the Key Splitting Server 10, Remote Management Server 14, and Managed Device 24. In FIG. 3, Key Splitting Server 10 includes Processing Circuitry 332, Communication Interfaces 330, and Memory 322, Remote Management Server 14 includes Processing Circuitry 304, Communication Interfaces 306, and Memory 302, and Managed Device 24 includes Processing Circuitry 320, Communication Interfaces 318, and Memory 314.

The communication interfaces (306, 318, 330) for each device may, for example, include one or more adapters and/or network interface adapters for converting electronic and/or optical signals received over one or more networks into electronic form for use by the respective device. The processing circuitry (304, 320, 330) for each device may, for example, include or consist of one or more microprocessors, e.g. central processing units (CPUs), multi-core processors, chips, and/or assemblies. The memory (302, 314, 322) for each device may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on the respective processing circuitry, and for storing data operated on by such program code.

For example, program code in Memory 322 in Key Splitting Server 10 may include Master Encryption Key Splitting, Distribution and Reconstruction Logic 324, which is operable to perform any of the functions and/or operations described herein with reference to Key Splitting Server 10, including those functions and/or operations associated with generating, splitting and/or distributing a master encryption key, and with regard to reconstructing the master encryption key to support start-up of the Managed Device 24. Program code in Memory 322 may also include Communication Filtering Logic 326, which is operable to prevent incoming communications to Key Splitting Server 10 from any managed device in the distributed computing environment, in response to the contents of the Managed Device List 328, while allowing and/or supporting outgoing communications from Key Splitting Server 10 to any managed device in the distributed computing environment. For each managed device in the distributed computing environment, Managed Device List 328 may include network addressing information, and a public key or certificate. Memory 322 may further be used to store the Master Encryption Key 30, Key Shares 36, and KSS Key Share 12 shown in FIG. 1, and may also be used to store the Decrypted MD Key Share 204, Decrypted RMS Key Share 206, Decrypted KSS Key Share 208 and Reconstructed Master Encryption Key 212 shown in FIG. 2.

Program code in Memory 302 in Remote Management Server 14 may include RMS Master Encryption Key Share Processing Logic 310, which is operable to perform any of the functions and/or operations described herein with reference to Remote Management Server 14, including those functions and/or operations associated with storing a remote management server key share received from Key Splitting Server 10, processing a master encryption key request received from Managed Device 24, and/or generating a master encryption key reconstruction request and sending the master encryption key reconstruction request to the Key Splitting Server 10. Memory 302 may further be used to store the RMS Key Share 16 shown in FIG. 1 and FIG. 2.

Program code in Memory 314 in Managed Device 24 may include Managed Device Master Encryption Key Share Processing Logic 316, which is operable to perform any of the functions and/or operations described herein with reference to Managed Device 24, including those functions and/or operations associated with receiving and storing a managed device key share received from Key Splitting Server 10, performing a start-up operation by generating a master encryption key request and sending the master encryption key request to Remote Management Server 14, and using a received reconstructed master encryption key to complete the start-up operation. For example, Managed Device Master Encryption Key Share Processing Logic 316 may be operable to perform or complete a start-up operation at least in part by using a reconstructed master encryption key received from Key Splitting Server 10 to encrypt the contents of Protected Key Store 356, which may include user passwords, token seeds, and/or other information that must be encrypted using the master encryption key at start up. Memory 314 may further be used to store the MD Key Share 26 shown in FIG. 1 and FIG. 2.

In the illustrative configuration of FIG. 3, Remote Management Server 14 is shown communicably coupled to the Internet 18, and a Firewall 372 is positioned between the Internet 18 and a Secure Network 374, which may be a secure local area network ("LAN") or the like that is under the control of Enterprise 20 (FIG. 1). The Key Splitting Server 10 and Managed Device 24 are communicably coupled to the Secure Network 374.

Figure 4:
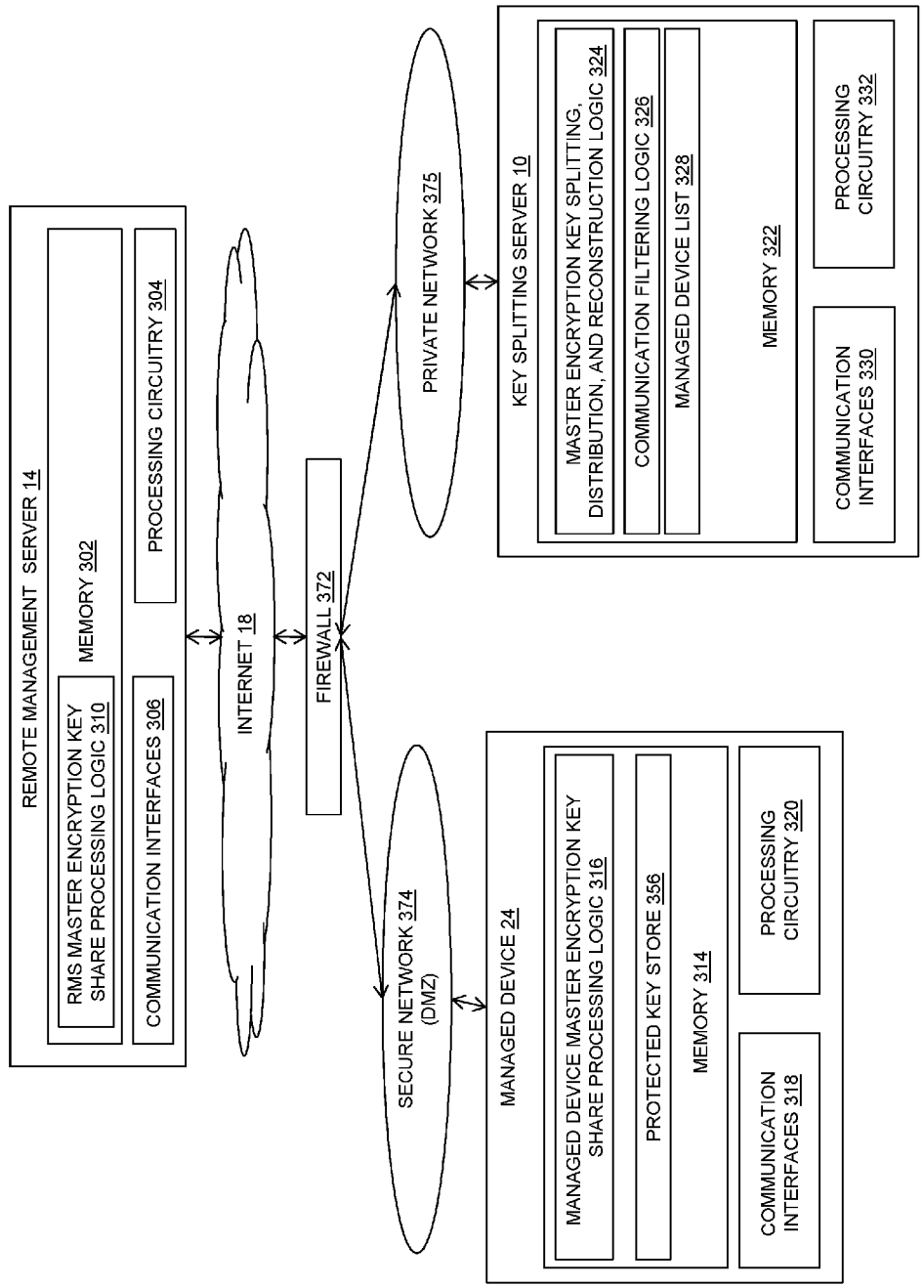
FIG. 4 is a block diagram showing an alternative illustrative embodiment including a key splitting server, remote management server, and a managed device.

FIG. 4 is a block diagram showing an alternative illustrative embodiment including a key splitting server, remote management server, and a managed device. In the alternative embodiment of FIG. 4, Key Splitting Server 10 is communicably coupled to a Private Network 375 located in Enterprise 20. In the alternative embodiment of FIG. 4, Secure Network 374 may be a network referred to in the area of computer security as a "DMZ" or "demilitarized zone", consisting of or including a physical or logical subnetwork that may be used by managed devices, such as Managed Device 24. In the alternative embodiment of FIG. 4, a network firewall, shown by Firewall 372, is configured to allow outgoing communications from Key Splitting Server 10 to only be directed to managed devices located on Secure Network 374 (e.g. to managed devices such as Managed Device 24), and to no other devices. In such an embodiment or configuration, Network Firewall 372 is also configured to prevent any communications from being directed to Key Splitting Server 10 from any managed device (e.g. from any managed device located on Secure Network 374).

Figure 5:
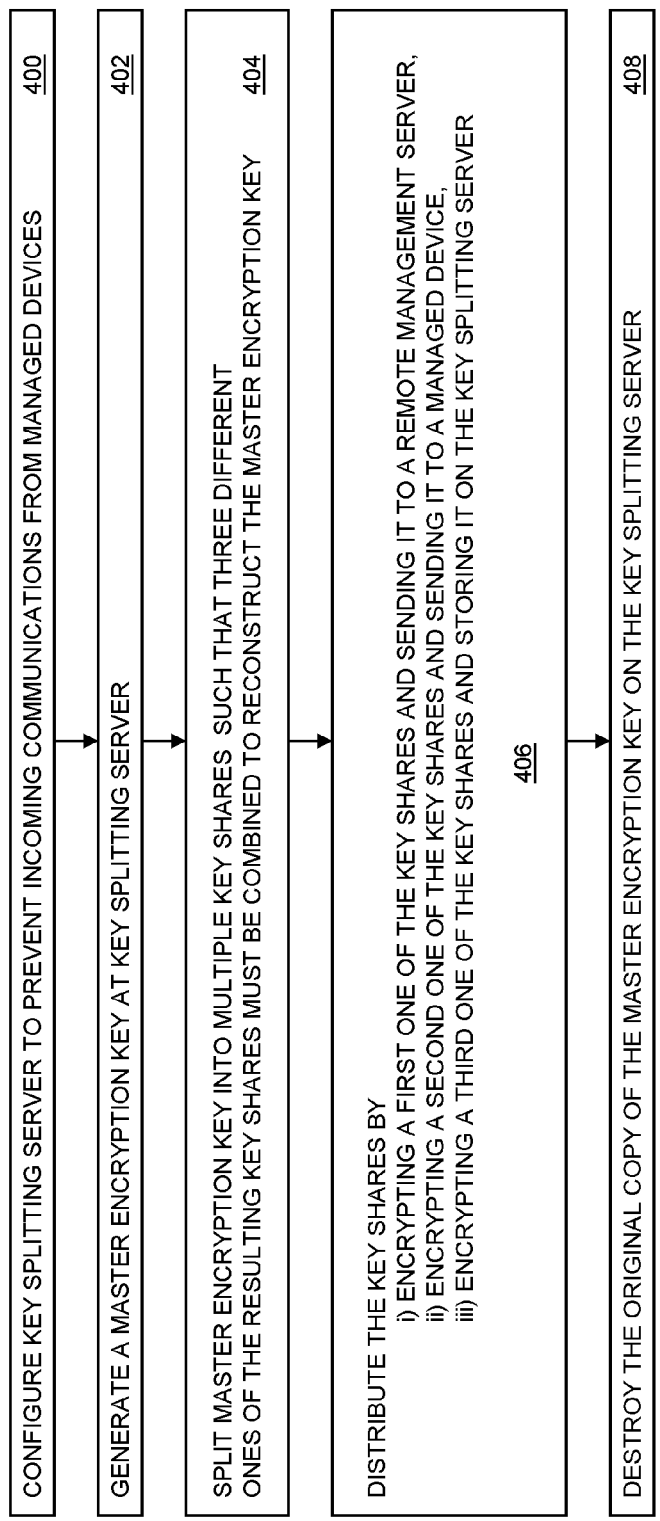
FIG. 5 is a flow chart showing steps performed in an illustrative embodiment to split a master encryption key into multiple key shares and distribute the key shares from a key splitting server to components of a distributed computing system in order to secure the master encryption key against unauthorized access.

FIG. 5 is a flow chart showing steps performed in an illustrative embodiment to split a master encryption key into multiple key shares and distribute the resulting key shares from a key splitting server to components of a distributed computing system in order to secure the master encryption key against unauthorized access. At step 400, the key splitting server may be configured to prevent incoming communications to the key splitting server from managed devices in the distributed computing environment, and to allow outgoing communications from the key splitting server only to managed devices in the distributed computing environment. Alternatively at step 400, a network firewall may be configured to allow outgoing communications from the key splitting server to only be directed to the managed devices in the distributed computing environment, and to no other devices, and also to prevent any communications from being directed to the key splitting server from any managed device in the distributed computing environment.

At step 402, the key splitting server generates a master encryption key. At step 404, the key splitting server splits the master encryption key using a polynomial-based secret sharing technique, such that three different ones of the resulting key shares must be combined to reconstruct the master encryption key.

At step 406, the key splitting server distributes the key shares by i) encrypting a first one of the key shares and sending it to a remote management server, ii) encrypting a second one of the key shares and sending it to a managed device, and iii) encrypting a third one of the key shares and storing it on the key splitting server.

At step 408, the key splitting server destroys the original copy of the master encryption key on the key splitting server.

Figure 6:
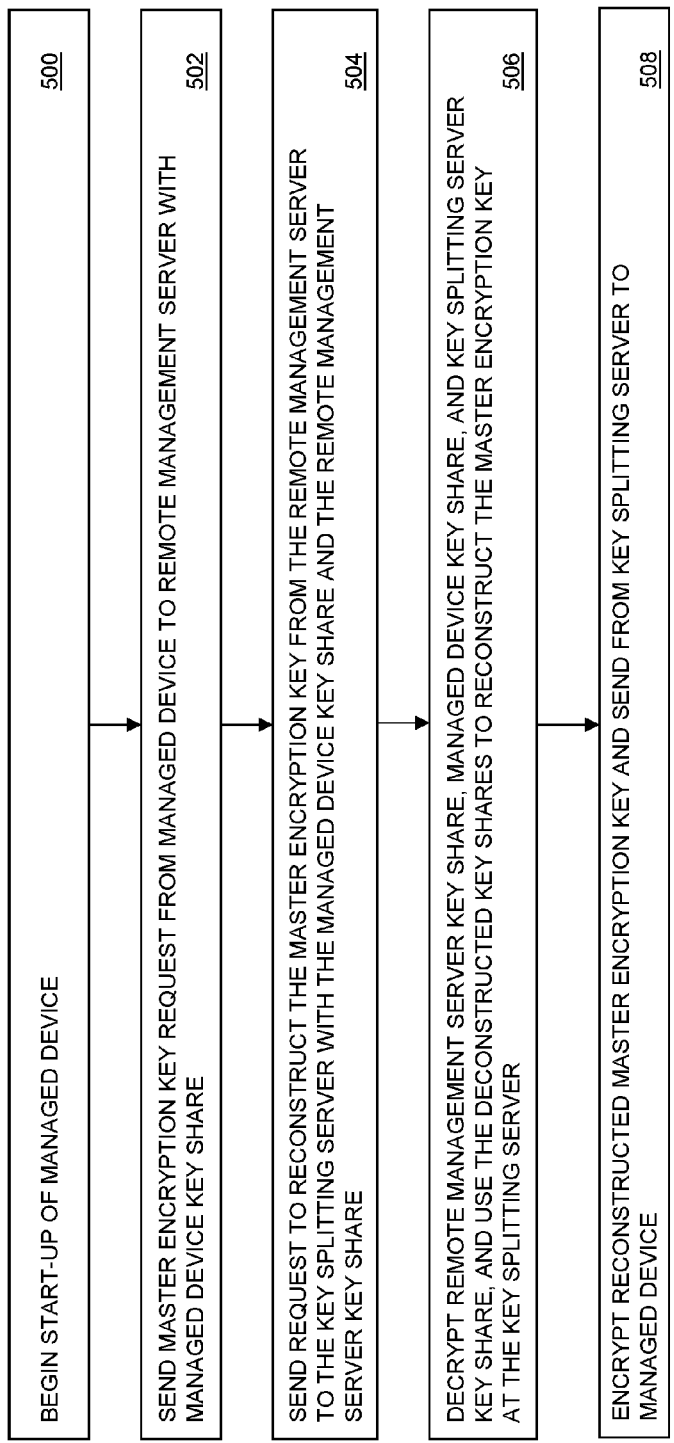
FIG. 6 is a flow chart showing steps performed in an illustrative embodiment to start-up a managed device by reconstructing the master encryption key and providing the reconstructed master encryption key to the managed device.

FIG. 6 is a flow chart showing steps performed in an illustrative embodiment to perform an unattended start-up operation with regard to a managed device by reconstructing the master encryption key and providing the reconstructed master encryption key to the managed device. At step 500, the start-up operation for the managed device begins, for example in response to the managed device being initially deployed, and/or when the managed device must be re-initialized after experiencing a failure, such as after a power-loss, and/or when the managed device must be initialized or re-initialized for some other reason.

At step 502, the managed device sends a master encryption key request from the managed device to the remote management server. The master encryption key request includes a copy of the managed device key share stored on the managed device.

At step 504, the remote management server responds to receipt of the master encryption key request from the managed device by sending a request to reconstruct the master encryption key from the remote management server to the key splitting server. The request to reconstruct the master encryption key includes an identifier of the managed device that requested the master encryption key, the managed device key share received from the managed device, and a copy of the remote management server key share stored on the remote management server.

At step 506, in response to receipt of the request to reconstruct the master encryption key from the remote management server, the key splitting server decrypts the remote management server key share managed device key share contained in the request to reconstruct the master encryption key, and the key splitting server key share stored on the key splitting server. The key splitting server then uses the decrypted key shares to generate a reconstructed master encryption key.

At step 508, the key splitting server encrypts the reconstructed master encryption key, and sends the encrypted reconstructed master encryption key from the key splitting server to the managed device that issued the request for the master encryption key.

The disclosed system advantageously prevents an attacker who gains unauthorized access to a single device from using information from within that device to access and/or reconstruct a master encryption key. The disclosed system improves over previous systems by ensuring that in order to successfully obtain the master encryption key, an attacker must successfully attack three separate components of the distributed system—i) the remote management server, ii) the key splitting server, and iii) the managed device. As a result, the security of both the individual managed device and of the complete distributed system is significantly improved.

In addition, the disclosed system supports unattended start-up of a managed device, since the disclosed system may automatically and securely provide the master encryption key to the managed device during a start-up operation. Thus the disclosed system enables start-up of the managed device to be performed without requiring an administrator user to enter or otherwise provide their password in order for the master encryption key to be made available to the managed device during the start-up operation.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, while the above description uses the term "managed device", it should be recognized by those skilled in the art that embodiments of the disclosed system may include or consist of various specific types of managed devices. Examples of managed devices include set-top boxes that are remotely managed by a cable company/service provider, and that may contain sensitive data, encrypted using a master encryption key that is split according to the disclosed system, with the resulting shares distributed between server systems of a cable company/service provider and the set-top boxes. Another example of a managed device that may be part of an embodiment of the disclosed system is a mobile device, such as, for example, a mobile phone, in which case the relevant enterprise may, for example, be a wireless telecommunications facilities-based service provider or the like. The preceding examples do not constitute an exhaustive list, and those skilled in the art will recognize that other types of managed devices may be used as may be appropriate for specific deployments or execution environments.

Similarly, the "key splitting server" and "remote management server" indicated in the above description are only examples of the various specific types of servers that may be used in specific embodiments of the disclosed system. Accordingly, such server systems may, for example, include servers under the control of a cable company or other type of service provider, as in an embodiment in which the managed devices include set-top boxes, and/or under the control of a wireless telecommunications service provider, as in an embodiment in which the managed devices include mobile devices such as mobile phones or the like.

And it will also be recognized that the term "enterprise" may refer to any organization or group of users that is associated with, in control of, and/or uses at least one server and/or at least one managed device, such as a business, company or corporation (e.g. cable company, wireless service provider, etc.).

It should further be understood that the disclosed system may be embodied to support protection of data belonging to any specific number of users. For example, in embodiments in which the managed devices themselves include or consist of servers, such as what are sometimes referred to and/or known as "managed servers" and/or "enterprise appliances", the disclosed system may operate to protect data belonging to relatively large numbers of users. In such embodiments, a given master encryption key may, for example, be the same for all users, and there may further be a hierarchy of encryption keys that are unique per-user or per-user device, and that may each be wrapped using the master encryption key.

Alternatively, in embodiments in which the managed devices include or consist of what are sometimes referred to and/or known as "endpoint" type devices in a distributed computing system, the disclosed system may operate to protect data belonging to a single user, or to a small group of users sharing the same device. In such embodiments, the master encryption key may be unique per user or unique per device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of protecting a master encryption key in a distributed computing system, comprising:
   generating, by a key splitting server, a master encryption key;
   splitting the master encryption key, by the key splitting server, into multiple key shares using a polynomial-based secret sharing technique, wherein the splitting is performed such that at least three different ones of the key shares must be combined in order to reconstruct the master encryption key;
   distributing individual ones of the key shares, by the key splitting server, to different components in the distributed computing system by
      generating a remote management key share by encrypting a first one of the key shares using a key encryption key stored on the key splitting server and sending the remote management key share from the key splitting server to a remote management server to be stored on the remote management server,
      generating a managed device key share by encrypting a second one of the key shares using the key encryption key and sending the device key share to at least one managed device to be stored on the managed device, and
      generating a key splitting server key share by storing a third one of the key shares on the key splitting server;
   destroying, by the key splitting server, the master encryption key; and
   performing a start-up operation on the managed device at least in part by
      receiving a reconstructed master encryption key by the managed device,
      using the reconstructed master encryption key by the managed device to complete the start-up operation at least in part by encrypting a protected key store located within the managed device using the reconstructed master encryption key, and
      after using the reconstructed master encryption key by the managed device to complete the start-up operation, destroying all local copies of the reconstructed master encryption key on the managed device.

2. The method of claim 1, wherein encrypting the first one of the key shares to generate the remote management server key share includes performing a key wrapping operation on the first key share using the key encryption key; and wherein encrypting the second one of the key shares to generate the managed device key share includes performing a key wrapping operation on the second key share using the key encryption key.

3. The method of claim 2, wherein the key encryption key comprises the key splitting server key share;

wherein performing the key wrapping operation on the first key share includes wrapping the first key share using the key splitting server key share; and wherein performing the key wrapping operation on the second key share includes wrapping the second key share using the key splitting server key share.

4. The method of claim 2, wherein the key encryption key comprises a public key of a public/private key pair uniquely assigned to the key splitting server;

wherein performing the key wrapping operation on the first key share includes wrapping the first key share using the public key of the public/private key pair uniquely assigned to the key splitting server; and wherein performing the key wrapping operation on the second key share includes wrapping the second key share using the public key of the public/private key pair uniquely assigned to the key splitting server.

5. The method of claim 2, wherein generating the key splitting server key share includes performing a key wrapping operation on the third one of the key shares, before storing the key splitting server key on the key splitting server, by wrapping the third one of the key shares using the public key of the public/private key pair uniquely assigned to the key splitting server.

6. The method of claim 2, further comprising configuring at least one component of the distributed computing system to allow outgoing communications from the key splitting server to the managed device and to prevent incoming communications to the key splitting server from the managed device.

7. The method of claim 6, wherein configuring at least one component of the distributed computing system to allow outgoing communications from the key splitting server to the managed device and to prevent incoming communications to the key splitting server from the managed device comprises configuring the key splitting server to allow outgoing communications from the key splitting server to the managed device and to prevent incoming communications to the key splitting server from the managed device.

8. The method of claim 6, wherein configuring at least one component of the distributed computing system to allow outgoing communications from the key splitting server to the managed device and to prevent incoming communications to the key splitting server from the managed device comprises configuring a network firewall to allow outgoing communications from the key splitting server to the managed device and to prevent incoming communications to the key splitting server from the managed device.

9. The method of claim 7, wherein configuring the key splitting server to allow outgoing communications to the managed device and to prevent incoming communications from the managed device to the key splitting server comprises:

receiving a list of managed devices, by the key splitting server from the remote management server, wherein the list of managed devices includes network addressing information for the managed device; and wherein the key splitting server allows outgoing communications from the key splitting server to the managed device and prevents incoming communications to the key splitting server from the managed device in response to the network addressing information for the managed device included in the list of managed devices.

10. The method of claim 6, wherein performing the start-up operation on the managed device further includes:

receiving, by the key splitting server from the remote management server, a request to reconstruct the master encryption key, wherein the request to reconstruct the master encryption key includes i) the remote management server key share, and ii) the managed device key share, wherein the managed device key share was received by the remote management server from the managed device, decrypting, by the key splitting server, the remote management server key share and the managed device key share, generating, by the key splitting server using the decrypted remote management server key share, the decrypted managed device key share and the key splitting server key share, a reconstructed master encryption key, and sending the reconstructed master encryption key from the key splitting server to the managed device.

11. The method of claim 10, wherein the key encryption key comprises the key splitting server key share;

wherein decrypting the remote management server key share comprises decrypting the remote management key share using the key splitting server key share; and wherein decrypting the managed device key share comprises decrypting the remote management key share using the key splitting server key share.

12. The method of claim 10, wherein the key encryption key comprises the public key of the public/private key pair uniquely assigned to the key splitting server;

wherein decrypting the remote management server key share comprises decrypting the remote management server key share using the private key of the public/private key pair uniquely assigned to the key splitting server; and wherein decrypting the managed device key share comprises decrypting the managed device key share using the private key of the public/private key pair uniquely assigned to the key splitting server.

13. The method of claim 10, wherein performing the start-up operation on the managed device further includes decrypting, by the key splitting server, the key splitting server key share using the private key of the public/private key pair uniquely assigned to the key splitting server.

14. The method of claim 10, wherein the list of managed devices further includes a public key of a public/private key pair uniquely assigned to the managed device; and wherein performing the start-up operation on the managed device further includes encrypting the reconstructed master encryption key using the public key of the public/private key pair uniquely assigned to the managed device prior to sending the reconstructed master encryption key from the key splitting server to the managed device.

15. The method of claim 1, wherein the protected key store located within the managed device stores at least one user password; and wherein encrypting the protected key store located within the managed device using the reconstructed master encryption key includes encrypting the at least one user password stored in the protected key store.

16. The method of claim 1, wherein the protected key store located within the managed device stores at least one token seed; and wherein encrypting the protected key store located within the managed device using the reconstructed master encryption key includes encrypting the at least one token seed stored in the protected key store.

17. The method of claim 1, wherein the managed device provides single sign-on security services to a plurality of users;

wherein the managed device maintains a plurality of unique encryption keys, and each one of the encryption keys is used by the managed device to encrypt the passwords of a corresponding one of the plurality of users; and wherein performing the start-up operation on the managed device further includes using the reconstructed master encryption key by the managed device to complete the start-up operation at least in part by encrypting each one of the plurality of encryption keys maintained by the managed device.

18. A computer program product having a non-transitory computer readable medium which stores a set of instructions operable to protect a master encryption key in a distributed computing system, the set of instructions, when executed by processing circuitry, causing the processing circuitry to:

generate, by a key splitting server, a master encryption key;

split the master encryption key, by the key splitting server, into multiple key shares using a polynomial-based secret sharing technique, wherein the splitting is performed such that at least three different ones of the key shares must be combined in order to reconstruct the master encryption key;

distribute individual ones of the key shares, by the key splitting server, to different components in the distributed computing system by generating a remote management key share by encrypting a first one of the key shares using a key encryption key stored on the key splitting server and sending the remote management key share from the key splitting server to a remote management server to be stored on the remote management server, generating a managed device key share by encrypting a second one of the key shares using the key encryption key and sending the device key share to at least one managed device to be stored on the managed device, generating a key splitting server key share by storing a third one of the key shares on the key splitting server; and destroy, by the key splitting server, the master encryption key; and perform a start-up operation on the managed device at least in part by receiving a reconstructed master encryption key by the managed device, using the reconstructed master encryption key by the managed device to complete the start-up operation at least in part by encrypting a protected key store located within the managed device using the reconstructed master encryption key, and after using the reconstructed master encryption key by the managed device to complete the start-up operation, destroying all local copies of the reconstructed master encryption key on the managed device.

19. The computer program product of claim 18, wherein the set of instructions, when executed by processing circuitry, further cause the processing circuitry to:

encrypt the first one of the key shares to generate the remote management server key share at least in part by performing a key wrapping operation on the first key share using the key encryption key; and encrypt the second one of the key shares to generate the managed device key share at least in part by performing a key wrapping operation on the second key share using the key encryption key.

20. The computer program product of claim 19, wherein the key encryption key comprises the key splitting server key share, and wherein the set of instructions, when executed by processing circuitry, further cause the processing circuitry to:

perform the key wrapping operation on the first key share at least in part by wrapping the first key share using the key splitting server key share; and perform the key wrapping operation on the second key share at least in part by wrapping the second key share using the key splitting server key share.

21. The computer program product of claim 19, wherein the key encryption key comprises a public key of a public/private key pair uniquely assigned to the key splitting server, and wherein the set of instructions, when executed by the processing circuitry, further cause the processing circuitry to:

perform the key wrapping operation on the first key share at least in part by wrapping the first key share using the public key of the public/private key pair uniquely assigned to the key splitting server; and perform the key wrapping operation on the second key share at least in part by wrapping the second key share using the public key of the public/private key pair uniquely assigned to the key splitting server.

22. The computer program product of claim 19, wherein the set of instructions, when executed by the processing circuitry, further cause the processing circuitry to:

generate the key splitting server key share at least in part by performing a key wrapping operation on the third one of the key shares, before storing the key splitting server key on the key splitting server, by wrapping the third one of the key shares using the public key of the public/private key pair uniquely assigned to the key splitting server.

23. An apparatus, comprising:

memory; and processing circuitry coupled to the memory, the memory storing program code for protecting a master encryption key in a distributed computing system which, when executed by the processing circuitry, causes the processing circuitry to:

generate a master encryption key, split the master encryption key into multiple key shares using a polynomial-based secret sharing technique, wherein the splitting is performed such that at least three different ones of the key shares must be combined in order to reconstruct the master encryption key, distribute individual ones of the key shares to different components in the distributed computing system by
generating a remote management key share by encrypting a first one of the key shares using a key encryption key stored on a key splitting server and sending the remote management key share from the key splitting server to a remote management server to be stored on the remote management server,
generating a managed device key share by encrypting a second one of the key shares using the key encryption key and sending the device key share to at least one managed device to be stored on the managed device, and
generating a key splitting server key share by storing a third one of the key shares on the key splitting server, destroy the master encryption key, and perform a start-up operation on the managed device at least in part by
receiving a reconstructed master encryption key by the managed device,
using the reconstructed master encryption key by the managed device to complete the start-up operation at least in part by encrypting a protected key store located within the managed device using the reconstructed master encryption key, and
after using the reconstructed master encryption key by the managed device to complete the start-up operation, destroying all local copies of the reconstructed master encryption key on the managed device.

* * * * *